(12) United States Patent
Francis et al.

(10) Patent No.: US 12,393,412 B2
(45) Date of Patent: Aug. 19, 2025

(54) SYSTEM AND METHOD FOR ORCHESTRATING A PRIVATE SOFTWARE AS A SERVICE (PRIVATE SAAS) IN AN EXTERNAL HOSTING ENVIRONMENT

(71) Applicant: DevopsNow, Inc., Redwood City, CA (US)

(72) Inventors: Arul Jegadish Francis, Union City, CA (US); Satbir Chahal, San Jose, CA (US); Nikhil Ravindran, Boston, MA (US)

(73) Assignee: DevopsNow, Inc., Redwood City, CA (US)

( * ) Notice: Subject to any disclaimer, the term of this patent is extended or adjusted under 35 U.S.C. 154(b) by 196 days.

(21) Appl. No.: 18/489,023

(22) Filed: Oct. 18, 2023

(65) Prior Publication Data
US 2024/0126522 A1 Apr. 18, 2024

Related U.S. Application Data

(60) Provisional application No. 63/379,909, filed on Oct. 18, 2022.

(51) Int. Cl.
*G06F 9/50* (2006.01)
*G06F 8/60* (2018.01)
*G06F 9/445* (2018.01)
*G06F 9/455* (2018.01)
*G06F 15/16* (2006.01)
*H04L 12/911* (2013.01)
*H04L 29/08* (2006.01)

(52) U.S. Cl.
CPC ............ *G06F 8/60* (2013.01); *G06F 9/45558* (2013.01); *G06F 2009/4557* (2013.01)

(58) Field of Classification Search
CPC .................. G06F 8/60; G06F 9/45558; G06F 2009/4557; G06F 9/5072; G06F 8/63; G06F 9/547; G06F 21/50; G06F 8/76; G06F 21/54; G06F 40/03; H04L 63/104; H04L 63/0209; H04L 67/1001; H04L 67/133
See application file for complete search history.

(56) References Cited

U.S. PATENT DOCUMENTS 9,501,329 B2 * 11/2016 Spaltro .................. H04L 67/02
11,182,216 B2 * 11/2021 McWeeney ............ G06F 9/505

* cited by examiner

*Primary Examiner* — Thuy Dao
(74) *Attorney, Agent, or Firm* — Jason C. Cameron (57) ABSTRACT

A system and method for orchestrating private software as a service (private SaaS) in an external hosting environment. The system and method provide a way to orchestrate software products or components in an external hosting environment as a private SaaS offering without need for additional network access or credentials to access remote environment. The system uses a set of products managing and operating modules to deploy and manage software products in remote environments. Further, the system employs a set of telemetry agents to retrieve fine grained health information of software products under management. The system uses the health telemetry signals to determine the health of remotely managed software products and to take remediation actions if required. Such actions to remediate are managed using product managing and operating modules. Usage of product managing, operating and telemetry modules on remote external environment eliminates need for network access or account credentials for remote environment.

20 Claims, 5 Drawing Sheets

SYSTEM AND METHOD FOR ORCHESTRATING A PRIVATE SOFTWARE AS A SERVICE (PRIVATE SAAS) IN AN EXTERNAL HOSTING ENVIRONMENT

EARLIEST PRIORITY DATE

This application claims priority from a Provisional patent application filed in the United States of America having Patent Application No. 63/379,909, filed on Oct. 18, 2022, and titled "SYSTEM AND METHOD FOR PRIVATE SOFTWARE AS A SERVICE (SAAS) DEPLOYMENT FRAMEWORK".

TECHNICAL FIELD

Embodiments of the present disclosure generally relate to private software as a service (Private SaaS) deployment and management systems and more particularly to a system and a method for orchestrating a private software as a service (hereinafter referred to as private SaaS) in an external hosting environment.

BACKGROUND

Generally, software orchestration frameworks manage infrastructure components. In the current business landscape, organizations often find themselves in a situation where they must deploy and maintain a diverse array of software applications within their network boundaries. This necessity arises primarily to comply with various regulations and data residency requirements specific to their industry or jurisdiction. However, a significant challenge emerges when these organizations seek to have critical infrastructure managed as a service using a software as a service (SaaS) model. Many software vendors do not provide robust solutions for remote deployment and management, leaving organizations with the burden of self-hosting and self-managing these critical software components.

Existing solutions often demand unfettered network access or elevated privileges within an organization's infrastructure to enable the deployment and management of software products. This approach, while attempting to meet operational needs, can inadvertently introduce security vulnerabilities, potentially compromising the organization's overall security posture.

Consequently, there is a need for an improved system and a method for orchestrating a software as a service (private SaaS) in an external hosting environment.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

An aspect of the present disclosure provides a system for orchestrating a private software as a service (private SaaS) in an external hosting environment. The system retrieves one or more telemetry agents from one or more sources associated with an external hosting environment. The one or more telemetry agents generate one or more telemetry signals. The external hosting environment comprises one or more software products and one or more software components of one or more software products. Further, the system connects a central monitoring and alerting load balancer associated with the external hosting environment, to the retrieved one or more telemetry agents. Furthermore, the system continuously monitors a health status of the one or more software products and the one or more software components, based on the connection, by triggering, via the central monitoring and alerting load balancer, the one or more telemetry agents to monitor the health status. Additionally, the system determines, via the central monitoring and the alerting load balancer, the health status of the one or more software products and the one or more components of the one or more software products. Further, the system transmits, via the one or more telemetry agents, the determined health status, to the central monitoring and the alerting load balancer. Furthermore, the system manages, via at least one of a virtual private cloud (VPC) and a virtual network (VNet) associated with the external hosting environment, one or more software products associated with the external hosting environment, based on the connection. Further, the system manages one or more operations of the one or more software products, based on the health status.

Another aspect of the present disclosure provides a method for orchestrating a private software as a service (private SaaS) in an external hosting environment. The method includes retrieving one or more telemetry agents from one or more sources associated with an external hosting environment. The one or more telemetry agents generate one or more telemetry signals. The external hosting environment comprises one or more software products and one or more software components of one or more software products. Further, the method includes connecting a central monitoring and alerting load balancer associated with the external hosting environment, to the retrieved one or more telemetry agents. Furthermore, the method includes continuously monitoring a health status of the one or more software products and the one or more software components, based on the connection, by triggering, via the central monitoring and alerting load balancer, the one or more telemetry agents to monitor the health status. Additionally, the method includes determining, via the central monitoring and the alerting load balancer, the health status of the one or more software products and the one or more components of the one or more software products. Further, the method includes transmitting, via the one or more telemetry agents, the determined health status, to the central monitoring and the alerting load balancer. Furthermore, the method includes managing, via at least one of a virtual private cloud (VPC) and a virtual network (VNet) associated with the external hosting environment, one or more software products associated with the external hosting environment, based on the connection. Additionally, the method includes managing one or more operations of the one or more software products, based on the health status.

Yet another aspect of the present disclosure provides a non-transitory computer-readable storage medium having instructions stored therein. That, when executed by one or more hardware processors, causes the one or more hardware processors to retrieve one or more telemetry agents from one or more sources associated with an external hosting environment. The one or more telemetry agents generate one or more telemetry signals. The external hosting environment comprises one or more software products and one or more software components of one or more software products. Further, the one or more hardware processors connect a central monitoring and alerting load balancer associated with the external hosting environment, to the retrieved one or more telemetry agents. Furthermore, the one or more hardware processors continuously monitor a health status of the one or more software products and the one or more software components, based on the connection, by triggering, via the central monitoring and alerting load balancer, the one or more telemetry agents to monitor the health status. Further, the one or more hardware processors determine, via the central monitoring and the alerting load balancer, the health status of the one or more software products and the one or more components of the one or more software products. Additionally, the one or more hardware processors transmit, via the one or more telemetry agents, the determined health status, to the central monitoring and the alerting load balancer. Further, the one or more hardware processors manage, via at least one of a virtual private cloud (VPC) and a virtual network (VNet) associated with the external hosting environment, one or more software products associated with the external hosting environment, based on the connection. Furthermore, the one or more hardware processors manage one or more operations of the one or more software products, based on the health status.

The system and method provide a way to orchestrate software products or components in an external hosting environment as a private SaaS offering without the need for additional network access or credentials to access the remote environment. The system uses a set of products managing and operating modules to deploy and manage software products in the remote environment. Further, the system employs a set of telemetry agents to retrieve fine grained health information of the software products under management. The system then uses these health telemetry signals to determine the health of the remotely managed software products and to take remediation actions if required. Such actions to remediate are managed using the product managing and operating modules. The usage of the product managing, operating and the telemetry modules on the remote external environment eliminates the need for network access or account credentials for the remote environment.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module includes dedicated circuitry or logic that is permanently configured (within a special-purpose processor) to perform certain operations. In another embodiment, a "module" or s "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

The term "private", or "private software as a service", or "private SaaS", referred herein may be a Software as a Service (SaaS) hosted on a private cloud or customer infrastructure, or a on-premises infrastructure, a privately held infrastructure, a securely held infrastructure, and the like. The private SaaS enables organizations to access and manage tailored software solutions within their own dedicated cloud environment. By leveraging the benefits of a private cloud, businesses can ensure data privacy, compliance, and scalability, enabling private SaaS to be a practical and customizable solution that meets the specific needs of recent enterprises. In essence, private SaaS transforms customer-centric solutions for enhanced operational efficiency and digital transformation.

Embodiments of the present disclosure provide a system and a method for orchestrating a private software as a service (private SaaS) in an external hosting environment. The present disclosure provides enhanced security, by eliminating the requirement for ingress network access and elevated access privileges. Further, the present disclosure ensures that organizations can maintain the integrity of their security protocols and network boundaries without compromise. Additionally, the present disclosure streamlines software deployment, enabling organizations to effortlessly deploy and manage even the most complex software products within the familiar confines of their network parameters. This simplification of the deployment process not only reduces complexities but also enhances operational efficiency. Further, in cases where software health is compromised, the system takes proactive and autonomous steps, such as initiating software upgrades, updates, or resolving software issues. This self-healing capability minimizes downtime and optimizes the overall health of the deployed software.

Furthermore, the system proactively monitors and alerts the health status of one or more components and the software itself, promptly dispatching alerts to engineers. This real-time information empowers engineers to make well-informed decisions regarding the software, ensuring that any issues are addressed swiftly. Furthermore, the system enables seamless coordination among key components, such as telemetry agents, deployment agents, and clusters. These components work harmoniously within both Virtual Private Clouds (VPCs) and Virtual Networks (VNets), ensuring efficient deployment and management of software while upholding network integrity.

Referring now to the drawings, and more particularly to FIG. 1 through FIG. 5, where similar reference characters denote corresponding features consistently throughout the figures, there are shown preferred embodiments, and these embodiments are described in the context of the following exemplary system and/or method.

Figure 1:
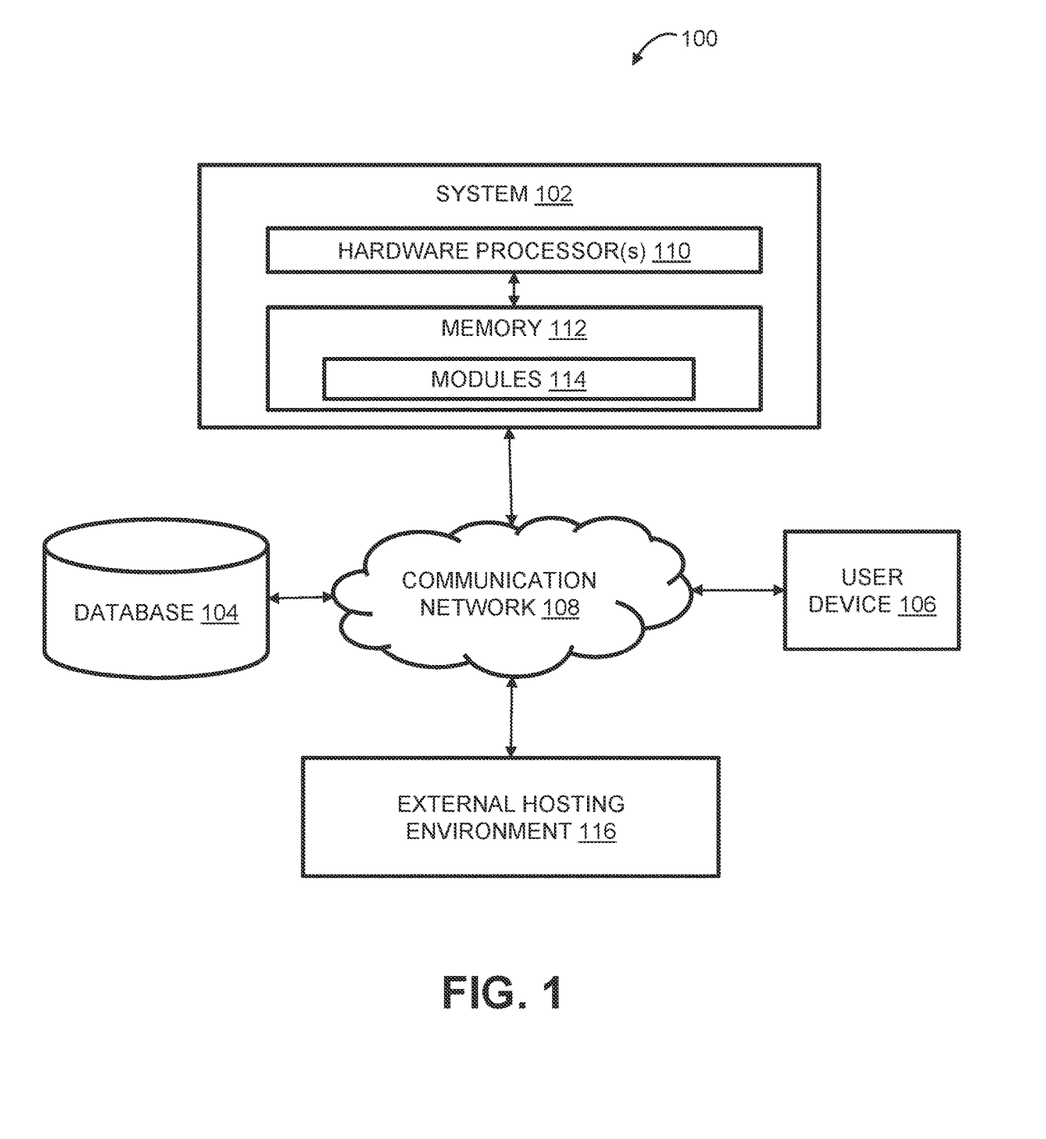
FIG. 1 illustrates an exemplary block diagram representation of a network architecture implementing a system for orchestrating a private software as a service (private SaaS) in an external hosting environment, in accordance with an embodiment of the present disclosure.

FIG. 1 illustrates an exemplary block diagram representation of a network architecture 100 implementing a system 102 for orchestrating a private software as a service (private SaaS) in an external hosting environment, in accordance with an embodiment of the present disclosure. According to FIG. 1, the network architecture 100 includes a system 102, a database 104, one or more user devices 106, and one or more external hosting environments 116. The one or more user devices 106 may be associated with one or more users, and communicatively coupled to the system 102 via a communication network 108. In an exemplary embodiment of the present disclosure, the user devices 106 may include a laptop computer, desktop computer, tablet computer, smartphone, wearable device, a digital camera, and the like. Further, the communication network 108 may be a wired network or a wireless network. The system 102 may be at least one of, but not limited to, a central server, a cloud server, a remote server, an electronic device, a portable device, and the like. Further, the system 102 may be communicatively coupled to the database 104, via the communication network 108. The database 104 may include, but is not limited to, one or more telemetry signals, alerts, health status, any other data, and combinations thereof. Some examples of telemetry signals may include logs from application components, measurements such a central processing unit (CPU), memory and the like. In general, any signal that can help the system determine the health of the remote components. The database 104 may be any kind of databases/repositories such as, but are not limited to, relational database, dedicated database, dynamic database, monetized database, scalable database, cloud database, distributed database, any other database, and combination thereof.

Further, the one or more external hosting environments 116 includes, but is not limited to, multiple cloud environments, hybrid cloud environments, coloration environments, on-premises infrastructure environments, edge computing environments, a private cloud/infrastructure environment, and the like. Further, the user device 106 may be associated with, but not limited to, a user, an individual, an administrator, a vendor, a technician, a worker, a specialist, a healthcare worker, an instructor, a supervisor, a team, an entity, an organization, a company, a facility, a bot, any other user, and combination thereof. The entities, the organization, and the facility may include, but are not limited to, a hospital, a healthcare facility, an exercise facility, a laboratory facility, an e-commerce company, a merchant organization, an airline company, a hotel booking company, a company, an outlet, a manufacturing unit, an enterprise, an organization, an educational institution, a secured facility, a warehouse facility, a supply chain facility, any other facility and the like. The user device 106 may be used to provide input and/or receive output to/from the system 102, and/or to the database 104, respectively. The user device 106 may present to the user one or more user interfaces for the user to interact with the system 102 and/or to the database 104 for a private software as a service (private SaaS) orchestration needs. The user device 106 may be at least one of, an electrical, an electronic, an electromechanical, and a computing device. The user device 106 may include, but is not limited to, a mobile device, a smartphone, a personal digital assistant (FDA), a tablet computer, a phablet computer, a wearable computing device, a virtual reality/augmented reality (VR/AR) device, a laptop, a desktop, a server, and the like.

The term "orchestration" in the present disclosure implies deployment, monitoring, optimization managing applications across the one or more external hosting of environments 116. For example, orchestration involves coordinating and automating various tasks and processes related to the lifecycle and health status of applications, including deployment, monitoring, optimization, and management, to ensure efficient operation in multi-cloud environments or external hosting environments such as customer infrastructure.

Further, the system 102 may be implemented by way of a single device or a combination of multiple devices that may be operatively connected or networked together. The system 102 may be implemented in hardware or a suitable combination of hardware and software. The system 102 includes one or more hardware processor(s) 110, and a memory 112. The memory 112 may include a plurality of modules 114. The system 102 may be a hardware device including the hardware processor 110 executing machine-readable program instructions for orchestrating a private software as a service (private SaaS) in an external hosting environment. Execution of the machine-readable program instructions by the hardware processor 110 may enable the proposed system 102 to orchestrate a private software as a service (private SaaS) in an external hosting environment. The "hardware" may comprise a combination of discrete components, an integrated circuit, an application-specific integrated circuit, a field-programmable gate array, a digital signal processor, or other suitable hardware. The "software" may comprise one or more objects, agents, threads, lines of code, subroutines, separate software applications, two or more lines of code, or other suitable software structures operating in one or more software applications or on one or more processors.

The one or more hardware processors 110 may include, for example, microprocessors, microcomputers, microcontrollers, digital signal processors, central processing units, state machines, logic circuits, and/or any devices that manipulate data or signals based on operational instructions. Among other capabilities, hardware processor 110 may fetch and execute computer-readable instructions in the memory 112 operationally coupled with the system 102 for performing tasks such as data processing, input/output processing, and/or any other functions. Any reference to a task in the present disclosure may refer to an operation being or that may be performed on data.

Though few components and subsystems are disclosed in FIG. 1, there may be additional components and subsystems which is not shown, such as, but not limited to, ports, routers, repeaters, firewall devices, network devices, databases, network attached storage devices, servers, assets, machinery, instruments, facility equipment, emergency management devices, image capturing devices, sensors, any other devices, and combination thereof. The person skilled in the art should not be limiting the components/subsystems shown in FIG. 1. Although FIG. 1 illustrates the system 102, and the user device 106 connected to the database 104, one skilled in the art can envision that the system 102, and the user device 106 can be connected to several user devices located at various locations and several databases via the communication network 108.

Those of ordinary skilled in the art will appreciate that the hardware depicted in FIG. 1 may vary for particular implementations. For example, other peripheral devices such as an optical disk drive and the like, local area network (LAN), wide area network (WAN), wireless (e.g., wireless-fidelity (Wi-Fi)) adapter, graphics adapter, disk controller, input/output (I/O) adapter also may be used in addition or place of the hardware depicted. The depicted example is provided for explanation only and is not meant to imply architectural limitations concerning the present disclosure.

Those skilled in the art will recognize that, for simplicity and clarity, the full structure and operation of all data processing systems suitable for use with the present disclosure are not being depicted or described herein. Instead, only so much of the system 102 as is unique to the present disclosure or necessary for an understanding of the present disclosure is depicted and described. The remainder of the construction and operation of the system 102 may conform to any of the various current implementations and practices that were known in the art.

In an exemplary embodiment, the system 102 may retrieve one or more telemetry agents from one or more sources associated with an external hosting environment 116. For example, the telemetry agents collect various health related telemetry signals such as logs, measurements of central processing unit (CPU) usage, memory usage, and the like, which helps the system 102 to accurately assess the health of the external/remote hosting environment and the health of the software products orchestrated on the external/remote hosting environments. The one or more telemetry agents generate one or more telemetry signals. Some examples of telemetry signals may include logs from application components, measurements such a central processing unit (CPU), memory and the like. In general, any signal that can help the system determine the health of the remote components. The external hosting environment includes, but is not limited to, one or more software products, one or more software components of one or more software products, and the like. The one or more sources includes, but are not limited to, clusters of container orchestration platforms, external virtual machines, and bare metal servers on one or more ports, and the like.

In an exemplary embodiment, the system 102 may connect a central monitoring and alerting load balancer associated with the external hosting environment 116, to the retrieved one or more telemetry agents.

In an exemplary embodiment, the system 102 may continuously monitor health status of the one or more software products and the one or more software components, based on the connection. In an exemplary embodiment, the system 102 may trigger, via the central monitoring and alerting load balancer, the one or more telemetry agents to monitor the health status. The health status includes, but is not limited to, logs and metrics corresponding to the health status of the one or more software products and the one or more components of the one or more software products, and the like. For example, the health status involves measuring and collecting any telemetry that enables the system 102 to accurately assess the health of external hosting environment. Some examples include logs, measurement of the usage of CPU/memory/disk, and the like, checks to ensure the components are up and running, and the like.

In an exemplary embodiment, the system 102 may determine, via the central monitoring and the alerting load balancer, the health status of the one or more software products and the one or more components of the one or more software products. For example, the health status may be determined using several signals such as "is the external hosting environment 116 responding to normal calls (determine if it is up or down)", "is the resource consumption normal for the external hosting environment 116 (CPU/memory/CPU)", and the like.

In an exemplary embodiment, the system 102 may transmit, via the one or more telemetry agents, the determined health status, to the central monitoring and the alerting load balancer.

In an exemplary embodiment, the system 102 may manage, via at least one of a virtual private cloud (VPC) and a virtual network (VNet) associated with the external hosting environment, one or more software products associated with the external hosting environment, based on the connection. Managing the VPC and/or VNet may include performing action to fix a health issue or to change the configuration or upgrading to a newer version or applying security patches. The VPC or Vnet within the external hosting environment (e.g., customer infrastructure) are used to execute one or more remote applications/software products, and modules. The VPC or Vnet may be a container within a cloud account.

In an exemplary embodiment, the system 102 may manage one or more operations of the one or more software products, based on the health status. The one or more operations includes, but is not limited to, upgrading, updating, fixing an issue, fixing error, fixing bug, of the one or more software products, and the like. The system 102 may detect that the health status of one or more remote products or software products is not good. The system 102 may push a change to bump up the resource allocated to the remote products or software products. In another example if there are new versions available for the remote products, and the system 102 may push the latest version to the external hosting environment 116. In yet another example, if configuration change or a security setting or patch may be pushed out to the external hosting environment 116.

Figure 2:
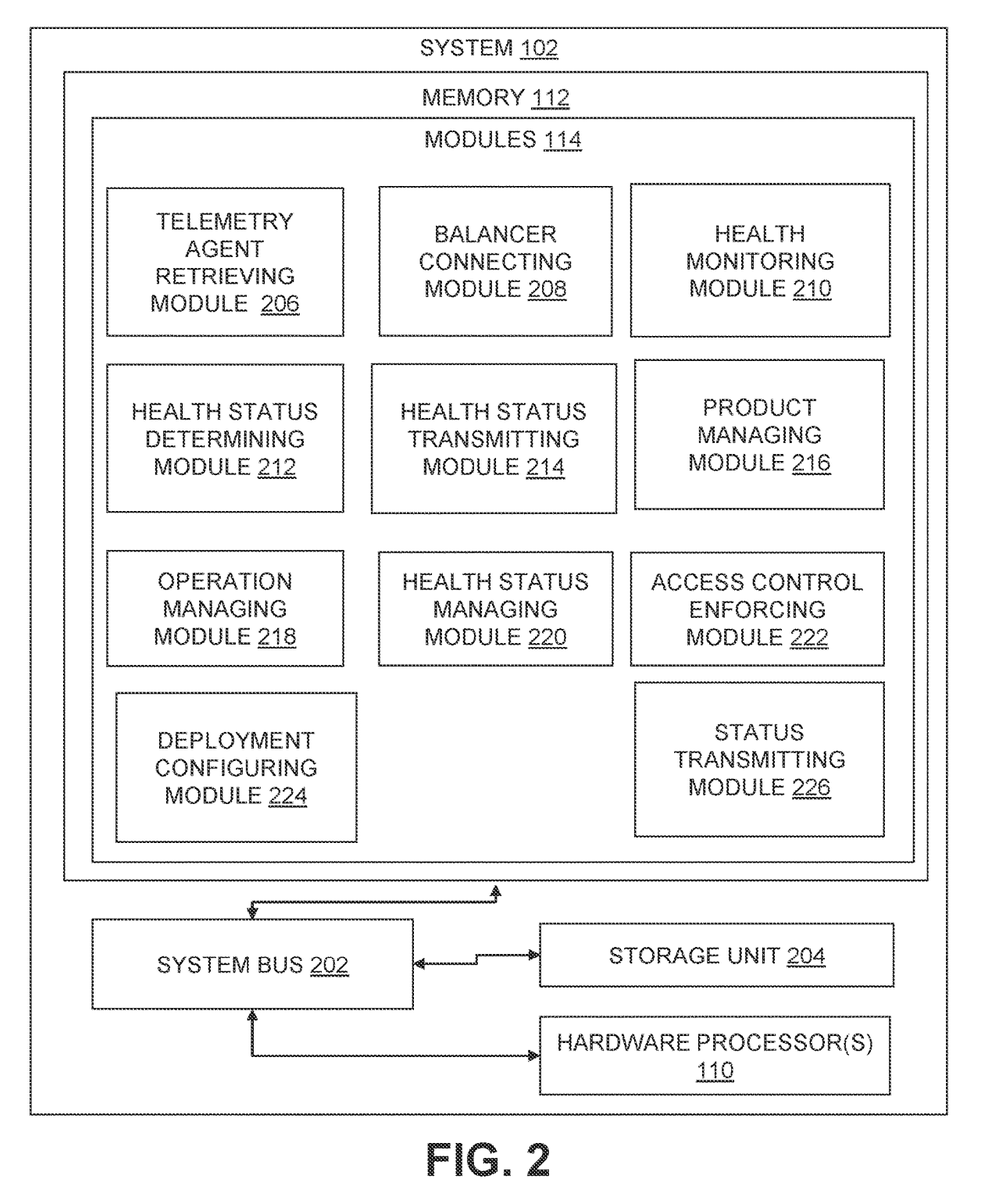
FIG. 2 illustrates an exemplary block diagram representation of a computer implemented system, such as those shown in FIG. 1, capable of orchestrating a private software as a service (private SaaS) in an external hosting environment, in accordance with an embodiment of the present disclosure.

FIG. 2 illustrates an exemplary block diagram representation of a computer implemented system 102, such as those shown in FIG. 1, capable of orchestrating a private software as a service (private SaaS) in an external hosting environment, in accordance with an embodiment of the present disclosure. The system 102 may also function as a computer-implemented system/server (hereinafter referred to as the system 102). The system 102 comprises the one or more hardware processors 110, the memory 112, and a storage unit 204. The one or more hardware processors 110, the memory 112, and the storage unit 204 are communicatively coupled through a system bus 202 or any similar mechanism. The memory 112 comprises a plurality of modules 114 in the form of programmable instructions executable by the one or more hardware processors 110.

Further, the plurality of modules 114 includes a telemetry agent retrieving module 206, a balancer connecting module 208, a health monitoring module 210, a health status determining module 212, a health status transmitting module 214, a product managing module 216, an operation managing module 218, a health status managing module 220, an access control enforcing module 222, a deployment configuring module 224, and a status transmitting module 226.

The one or more hardware processors 110, as used herein, means any type of computational circuit, such as, but not limited to, a microprocessor unit, microcontroller, complex instruction set computing exceptionally long processor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 110 may also include embedded controllers, such as generic or programmable logic devices or arrays, application-specific integrated circuits, single-chip computers, and the like.

The memory 112 may be a non-transitory volatile memory and a non-volatile memory. The memory 112 may be coupled to communicate with the one or more hardware processors 110, such as being a computer-readable storage medium. The one or more hardware processors 110 may execute machine-readable instructions and/or source code stored in the memory 112. A variety of machine-readable instructions may be stored in and accessed from the memory 112. The memory 112 may include any suitable elements for storing data and machine-readable instructions, such as read-only memory, random access memory, erasable programmable read-only memory, electrically erasable programmable read-only memory, a hard drive, a removable media drive for handling compact disks, digital video disks, diskettes, magnetic tape cartridges, memory cards, and the like. In the present embodiment, the memory 112 includes the plurality of modules 114 stored in the form of machine-readable instructions on any of the above-mentioned storage media and may be in communication with and executed by the one or more hardware processors 110.

The storage unit 204 may be a cloud storage or a repository such as those shown in FIG. 1. The storage unit 204 may store, but is not limited to, telemetry signals, alerts, operations, health status, any other data, and combinations thereof. The storage unit 204 may be any kind of databases repositories such as, but are not limited to, relational database, dedicated database, dynamic database, monetized database, scalable database, cloud database, distributed database, any other database, and combination thereof.

In an exemplary embodiment, the telemetry agent retrieving module 206 may retrieve one or more telemetry agents from one or more sources associated with an external hosting environment. The one or more telemetry agents generate one or more telemetry signals. The external hosting environment includes, but is not limited to, one or more software products, one or more software components of one or more software products, and the like. The one or more sources includes, but are not limited to, clusters of container orchestration platforms, external virtual machines, and bare metal servers on one or more ports, and the like.

In an exemplary embodiment, the balancer connecting module 208 may connect a central monitoring and alerting load balancer associated with the external hosting environment, to the retrieved one or more telemetry agents.

In an exemplary embodiment, the health monitoring module 210 may continuously monitor health status of the one or more software products and the one or more software components, based on the connection. In an exemplary embodiment, the system 102 may trigger, via the central monitoring and alerting load balancer, the one or more telemetry agents to monitor the health status. The health status includes, but is not limited to, logs and metrics corresponding to the health status of the one or more software products and the one or more components of the one or more software products, and the like.

In an exemplary embodiment, the health status determining module 212 may determine, via the central monitoring and the alerting load balancer, the health status of the one or more software products and the one or more components of the one or more software products.

In an exemplary embodiment, the health status transmitting module 214 may transmit, via the one or more telemetry agents, the determined health status, to the central monitoring and the alerting load balancer.

In an exemplary embodiment, the product managing module 216 may manage, via at least one of a virtual private cloud (VPC) and a virtual network (VNet) associated with the external hosting environment, one or more software products associated with the external hosting environment, based on the connection.

In an exemplary embodiment, the operation managing module 218 may manage one or more operations of the one or more software products, based on the health status. The one or more operations includes, but is not limited to, upgrading, updating, fixing an issue, fixing error, fixing bug, of the one or more software products, and the like.

In an exemplary embodiment, the health status managing module 220 may manage, via the one or more telemetry agents, a health of at least one of the VPC and the VNet associated with the external hosting environment, based on the one or more telemetry signals from the one or more telemetry agents.

In an exemplary embodiment, the access control enforcing module 222 may enforce one or more access control policies on the retrieved one or more telemetry agents.

In an exemplary embodiment, the deployment configuring module 224 may deploy one or more software products to be deployed on clusters of container orchestration platforms associated with the one or more sources, based on one or more deployment configurations stored in a repository associated with the external hosting environment.

Figure 3:
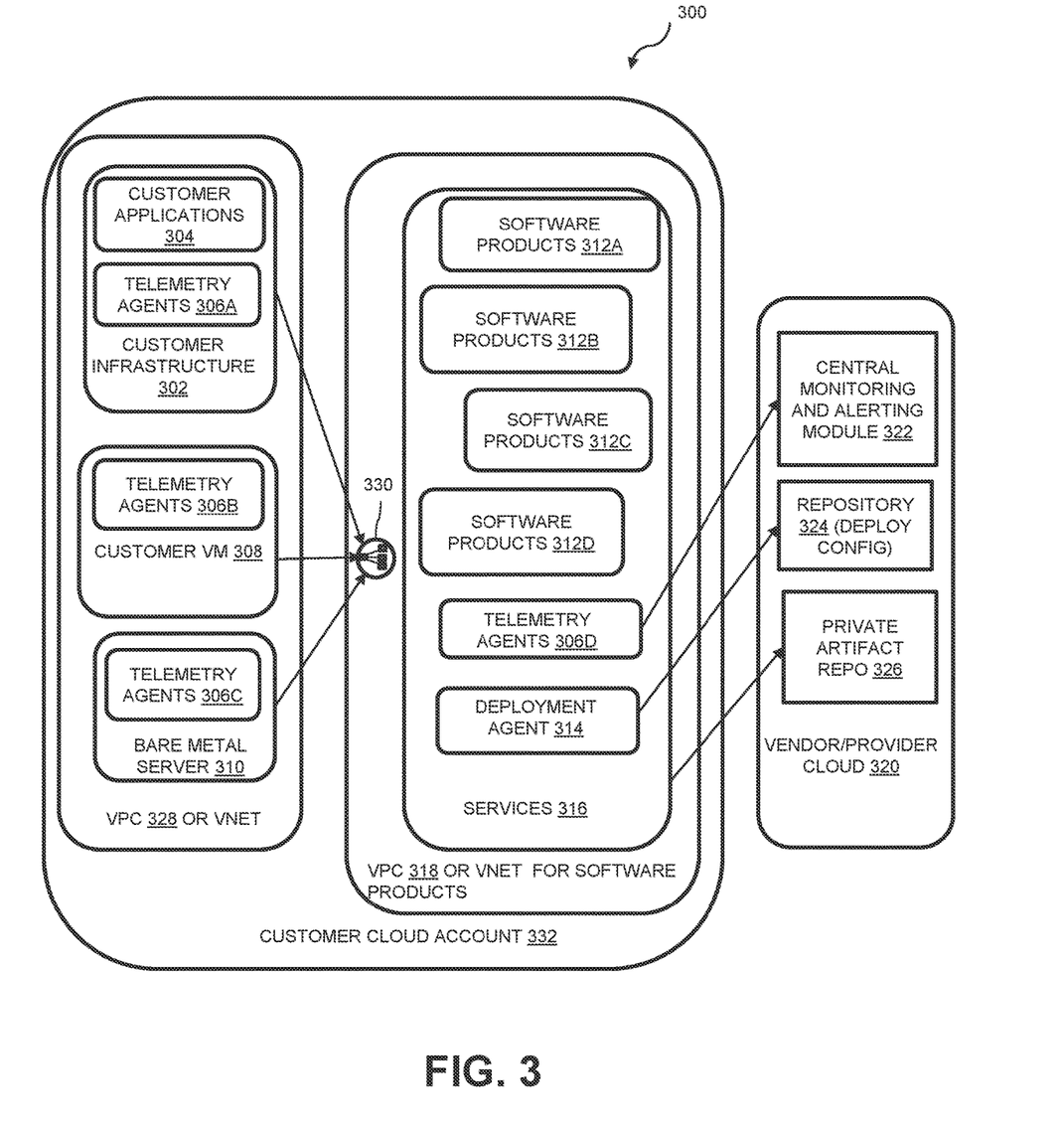
FIG. 3 illustrates an exemplary block diagram representation of a private Software as a Service (private SaaS) deployment framework, in accordance with an embodiment of the present disclosure.

In an exemplary embodiment, the status transmitting module 226 may transmit, via the one or more telemetry agents, the monitored health status of the one or more software products and the one or more components of the one or more software products, to the central monitoring and the alerting load balancer, FIG. 3 illustrates an exemplary block diagram representation of a private software as a service (private SaaS) deployment framework 300, in accordance with an embodiment of the present disclosure. The private SaaS deployment framework 300 provides a secure and a reliable way to deploy and manage a software within at least one of: a third-party network (also referred as a virtual private cloud (VPC) 318), a data center, a public cloud account such as a customer cloud account 332 (e.g., customer). The customer cloud account 332 may include, but is not limited to, web services account, a cloud platform account, and the like. The customer cloud account 332 includes the VPC (328, 318).

The private SaaS deployment framework 300 may not require any ingress network access or any credentials of, for example, a customer or an organization to deploy or manage the software, in an embodiment, the software includes DevOps tools and the like. All telemetry agents 306A to 3060 from at least one of: a customer infrastructure 302 (also referred to as a cluster 302), a customer virtual machine (VM) 308 and a bare metal server 310 reach a load balancer 330 on a 443 port. The load balancer 330 is a single point of access, which is used for enforcing access control policies. In an embodiment, at least one of: the cluster 302 (customer infrastructure 302), the customer virtual machine 308, and the bare metal server 310 are customer application components that are managed by operation monitoring tools.

The telemetry agent 306D reaches a central monitoring and alerting module 322 on the port 443 and manages all software tools from the VPC 318. The central monitoring and alerting module 322 help the telemetry agent 306D to continuously monitor the health of the software products deployed using the private SaaS framework 300. A deployment agent 314 reaches a repository 324 on the 443 ports. The cluster 316 is hosted within a customer's network where the software products are deployed. The cluster 316 includes various operating monitoring components which perform various functions. The operating monitoring components include various operating monitoring products and controller components that perform corresponding functions. Cluster 316 accesses a docker repository 326 on the port 443. In an embodiment, the docker repository 326 includes binaries (i.e., images) for the operating monitoring products and the controller components. The operating monitoring deployment agent 314 may be installed by a user, for example, the customer.

The telemetry agents 306A-306D and the deployment agent 314 may coordinate all deployment and management functions within the Virtual Private Cloud (VPC) 318 or Virtual Network (VNet). Various software such as software products 312A-312D are deployed by a vendor/provider cloud 320 within the VPC 318. The vendor/provider cloud 320 may not have direct access to the cluster 316. The cluster 302 customer infrastructure 302 includes customer applications 304. The VPC 328 includes at least one of: the clusters 302 (customer infrastructure 302), the virtual machine 308 and the bare metal server 310.

The repository 324 is utilized to manage all the deployment configuration. The deployment agent 314 reaches the repository 324 to search the stored configuration for the software that needs to be deployed on the cluster 316. In other words, the deployment agent 314 accesses the repository 324 that includes the deployment configuration. The deployment agent 314 utilizes the deployment configuration to coordinate and deploy the products (i.e., the software to be deployed on the cluster 316). The telemetry agents 306A-306D determine the health status of the components. The telemetry agents 306A-D further sends the health status of the components to the central monitoring and the alerting module 322 on the port 443 in order for the central monitoring and the alerting load balancer 122 to determine the health status of the components. Examples of the health status include, but are limited to, upgrading the software, deleting the software, installing a new update for the software, and the like.

The telemetry agents 306A-D send logs and metrics of the components to the central monitoring and the alerting module 322. The clusters 302 (customer infrastructure 302), the virtual machine 308 (customer VM) and the bare metal server 310 utilize the software tools present in the cluster 316 in order to manage the customers applications 304 running in the clusters 302 (customer infrastructure 302), the virtual machine 308 and the bare metal server 310. The telemetry agents 306A-D helps the private SaaS deployment framework 300 to manage health of the VPC (318, 328) of the external hosting environment, such that the private SaaS deployment framework 300 identifies the health status of the VPC 318 based on telemetry signals provided by the telemetry agents 306A-306D. The private SaaS deployment framework 300 takes automated decisions when the software is not healthy. In an embodiment, the automated decisions taken by the private SaaS deployment framework 300 includes operations, but is not limited to, upgrading, or updating the software, fixing an issue in the software, and the like. The customer sets aside the cluster 318 from the VPC (also referred as VPC 328) for running the components. The telemetry agents 306A-306D and the deployment agent 314 runs with the cluster 318.

Figure 4:
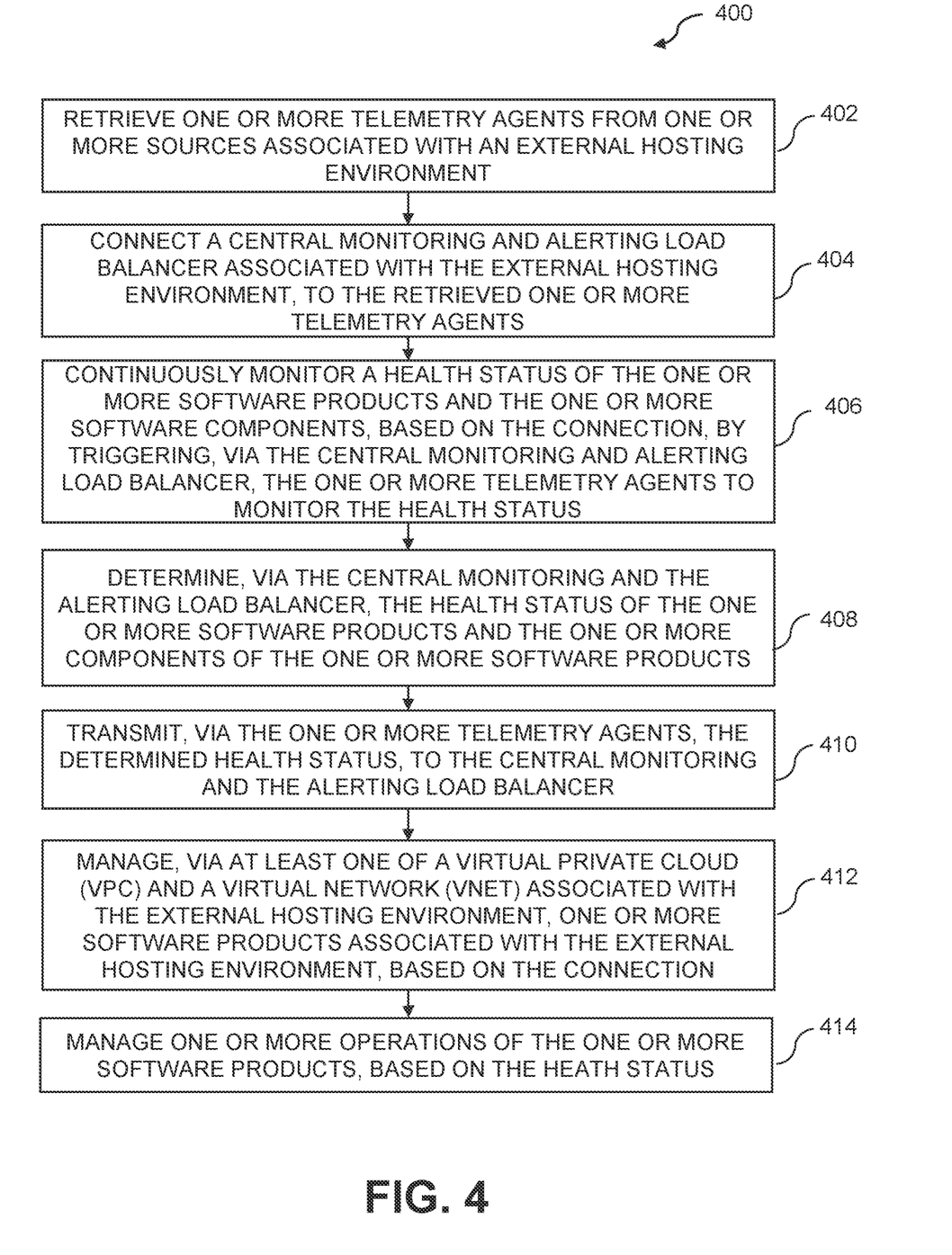
FIG. 4 illustrates a flow chart depicting a method of orchestrating private a software as a service (private SaaS) in an external hosting environment, in accordance with the embodiment of the present disclosure.

FIG. 4 illustrates a flow chart depicting a method 400 of orchestrating a private software as a service (private SaaS) in an external hosting environment, in accordance with the embodiment of the present disclosure.

At block 402, the method 400 may include retrieving, by one or more hardware processors 110, one or more telemetry agents from one or more sources associated with an external hosting environment. The one or more telemetry agents generate one or more telemetry signals. The external hosting environment comprises one or more software products and one or more software components of one or more software products. The one or more sources includes, but are not limited to, clusters of container orchestration platforms, external virtual machines, and bare metal servers on one or more ports, and the like.

At block 404, the method 400 may include connecting, by the one or more hardware processors 110, a central monitoring and alerting load balancer associated with the external hosting environment, to the retrieved one or more telemetry agents.

At block 406, the method 400 includes continuously monitoring, by the one or more hardware processors, a health status of the one or more software products and the one or more software components, based on the connection, by triggering, via the central monitoring and alerting load balancer, the one or more telemetry agents to monitor the health status.

At block 408, the method 400 includes determining, by the one or more hardware processors 110, via the central monitoring and the alerting load balancer, the health status of the one or more software products and the one or more components of the one or more software products. The health status includes logs and metrics corresponding to the health status of the one or more software products and the one or more components of the one or more software products, and the like.

At block 410, the method 400 includes transmitting, by the one or more hardware processors 110, via the one or more telemetry agents, the determined health status, to the central monitoring and the alerting load balancer.

At block 412, the method 400 includes managing, by the one or more hardware processors 110, via at least one of a virtual private cloud (VPC) and a virtual network (VNet) associated with the external hosting environment, one or more software products associated with the external hosting environment, based on the connection.

At block 414, the method 400 includes managing, by the one or more hardware processors 110, one or more operations of the one or more software products, based on the health status. The one or more operations includes, but are not limited to, upgrading, updating, fixing an issue, fixing error, fixing bug, of the one or more software products, and the like.

The method 400 may be implemented in any suitable hardware, software, firmware, or combination thereof. The order in which the method 400 is described is not intended to be construed as a limitation, and any number of the described method blocks may be combined or otherwise performed in any order to implement the method 400 or an alternate method. Additionally, individual blocks may be deleted from the method 400 without departing from the spirit and scope of the present disclosure described herein. Furthermore, the method 400 may be implemented in any suitable hardware, software, firmware, or a combination thereof, that exists in the related art or that is later developed. The method 400 describes, without limitation, the implementation of the system 102. A person of skill in the art will understand that method 400 may be modified appropriately for implementation in various manners without departing from the scope and spirit of the disclosure.

Figure 5:
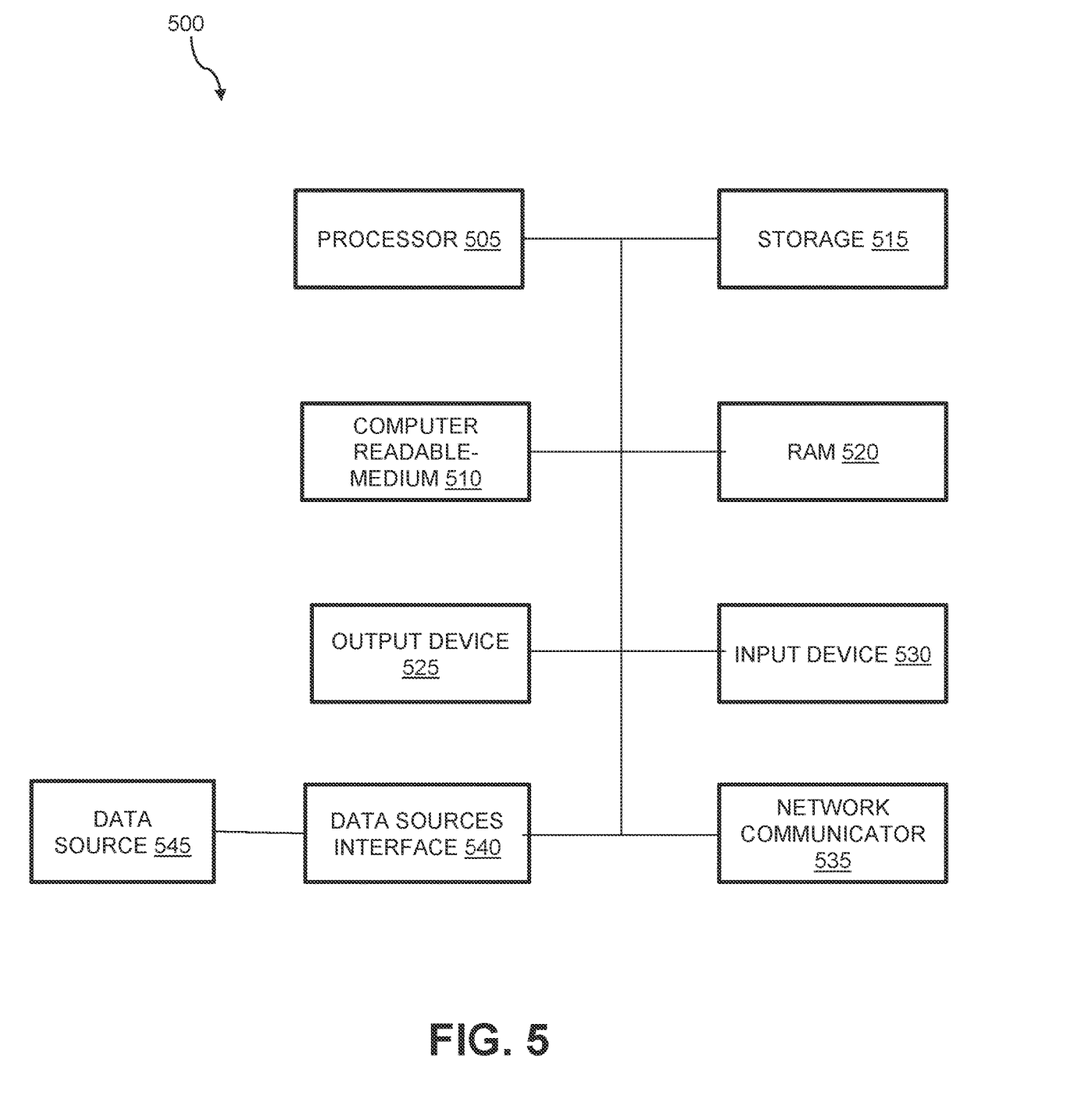
FIG. 5 illustrates an exemplary block diagram representation of a hardware platform for implementation of the disclosed system, according to an example embodiment of the present disclosure.

FIG. 6 illustrates an exemplary block diagram representation of a hardware platform 500 for implementation of the disclosed system 102, according to an example embodiment of the present disclosure. For the sake of brevity, the construction, and operational features of the system 102 which are explained in detail above are not explained in detail herein. Particularly, computing machines such as but not limited to internal/external server clusters, quantum computers, desktops, laptops, smartphones, tablets, and wearables may be used to execute the system 102 or may include the structure of the hardware platform 500. As illustrated, the hardware platform 500 may include additional components not shown, and some of the components described may be removed and/or modified. For example, a computer system with multiple GPUs may be located on external-cloud platforms including Amazon Web Services® (AWS), internal corporate cloud computing clusters, or organizational computing resources.

The hardware platform 500 may be a computer system such as the system 102 that may be used with the embodiments described herein. The computer system may represent a computational platform that includes components that may be in a server or another computer system. The computer system may be executed by the processor 505 (e.g., single, or multiple processors) or other hardware processing circuits, the methods, functions, and other processes described herein. These methods, functions, and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system may include the processor 505 that executes software instructions or code stored on a non-transitory computer-readable storage medium 510 to perform methods of the present disclosure. The software code includes, for example, instructions to gather data and analyze the data. For example, the plurality of modules 114 includes a telemetry agent retrieving module 206, a balancer connecting module 208, a health monitoring module 210, a health status determining module 212, a health status transmitting module 214, a product managing module 216, an operation managing module 218, a health status managing module 220, an access control enforcing module 222, a deployment configuring module 224, and a status transmitting module 226.

The instructions on the computer-readable storage medium 510 are read and stored the instructions in storage 515 or random-access memory (RAM). The storage 515 may provide a space for keeping static data where at least some instructions could be stored for later execution. The stored instructions may be further compiled to generate other representations of the instructions and dynamically stored in the RAM such as RAM 520. The processor 505 may read instructions from the RAM 520 and perform actions as instructed.

The computer system may further include the output device 525 to provide at least some of the results of the execution as output including, but not limited to, visual information to users, such as external agents. The output device 525 may include a display on computing devices and virtual reality glasses. For example, the display may be a mobile phone screen or a laptop screen. GUIs and/or text may be presented as an output on the display screen. The computer system may further include an input device 530 to provide a user or another device with mechanisms for entering data and/or otherwise interacting with the computer system. The input device 530 may include, for example, a keyboard, a keypad, a mouse, or a touchscreen. Each of these output devices 525 and input device 530 may be joined by one or more additional peripherals. For example, the output device 525 may be used to display the results such as bat responses by the executable chatbot.

A network communicator 535 may be provided to connect the computer system to a network and in turn to other devices connected to the network including other clients, servers, data stores, and interfaces, for example. A network communicator 535 may include, for example, a network adapter such as a LAN adapter or a wireless adapter. The computer system may include a data source interface 540 to access the data source 545. The data source 545 may be an information resource. As an example, a database of exceptions and rules may be provided as the data source 545. Moreover, knowledge repositories and curated data may be other examples of the data source 545.

Embodiments of the present disclosure provide a system and a method for orchestrating a private software as a service (private SaaS) in an external hosting environment. The present disclosure provides enhanced security, by eliminating the requirement for ingress network access and elevated access privileges. Further, the present disclosure ensures that organizations can maintain the integrity of their security protocols and network boundaries without compromise. Additionally, the present disclosure streamlines software deployment, enabling organizations to effortlessly deploy and manage even the most complex software products within the familiar confines of their network parameters. This simplification of the deployment process not only reduces complexities but also enhances operational efficiency. Further, in cases where software health is compromised, the system takes proactive and autonomous steps, such as initiating software upgrades, updates, or resolving software issues. This self-healing capability minimizes downtime and optimizes the overall health of the deployed software.

Furthermore, the system proactively monitors and alerts the health status of one or more components and the software itself, promptly dispatching alerts to engineers. This real-time information empowers engineers to make well-informed decisions regarding the software, ensuring that any issues are addressed swiftly. Furthermore, the system enables seamless coordination among key components, such as telemetry agents, deployment agents, and clusters. These components work harmoniously within both Virtual Private Clouds (VPCs) and Virtual Networks (VNets), ensuring efficient deployment and management of software while upholding network integrity.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer-readable medium can be any apparatus that can comprise, store, communicate, propagate, or transport the program for use by or in connection with the instruction execution system, apparatus, or device.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limited, of the scope of the invention, which is outlined in the following claims.

The invention claimed is:

1. A system for orchestrating a private software as a service (private SaaS) in an external hosting environment, the system comprising:
one or more hardware processors;
a memory coupled to the one or more hardware processors, wherein the memory comprises a plurality of modules in form of programmable instructions executable by the one or more hardware processors, and wherein the plurality of modules comprises:
a telemetry agent retrieving module configured to retrieve one or more telemetry agents from one or more sources associated with an external hosting environment, wherein the one or more telemetry agents generate one or more telemetry signals, wherein the external hosting environment comprises one or more software products and one or more software components of one or more software products;
a balancer connecting module configured to connect a central monitoring and alerting load balancer associated with the external hosting environment, to the retrieved one or more telemetry agents;

a health monitoring module configured to continuously monitor a health status of the one or more software products and the one or more software components, based on the connection, by triggering, via the central monitoring and alerting load balancer, the one or more telemetry agents to monitor the health status;

a health status determining module configured to determine, via the central monitoring and the alerting load balancer, the health status of the one or more software products and the one or more components of the one or more software products;

a health status transmitting module configured to transmit, via the one or more telemetry agents, the determined health status, to the central monitoring and the alerting load balancer;

a product managing module configured to manage, via at least one of a virtual private cloud (VPC) and a virtual network (VNet) associated with the external hosting environment, one or more software products associated with the external hosting environment, based on the connection; and an operation managing module configured to manage one or more operations of the one or more software products, based on the health status.

2. The system of claim 1, wherein the plurality of modules further comprises:

a health status managing module configured to manage, via the one or more telemetry agents, a health of at least one of the VPC and the VNet associated with the external hosting environment, based on the one or more telemetry signals from the one or more telemetry agents.

3. The system of claim 1, wherein the plurality of modules further comprises:

an access control enforcing module configured to enforce one or more access control policies on the retrieved one or more telemetry agents.

4. The system of claim 1, wherein the plurality of modules further comprises:

a deployment configuring module configured to deploy one or more software products to be deployed on clusters of container orchestration platforms associated with the one or more sources, based on one or more deployment configurations stored in a repository associated with the external hosting environment.

5. The system of claim 1 wherein the plurality of modules further comprises:

a status transmitting module configured to transmit, via the one or more telemetry agents, the monitored health status of the one or more software products and the one or more components of the one or more software products, to the central monitoring and the alerting load balancer.

6. The system of claim 1, wherein the one or more sources comprises at least one of clusters of container orchestration platforms, external virtual machines, and bare metal servers on one or more ports.

7. The system of claim 1, wherein the health status comprises logs and metrics corresponding to the health status of the one or more software products and the one or more components of the one or more software products.

8. The system of claim 1, wherein the one or more operations comprises at least one of upgrading, updating, fixing an issue, fixing error, and fixing bug, of the one or more software products.

9. A method for orchestrating a private software as a service (private SaaS) in an external hosting environment, the method comprising:

retrieving, by one or more hardware processors, one or more telemetry agents from one or more sources associated with an external hosting environment, wherein the one or more telemetry agents generate one or more telemetry signals, wherein the external hosting environment comprises one or more software products and one or more software components of one or more software products;

connecting, by the one or more hardware processors, a central monitoring and alerting load balancer associated with the external hosting environment, to the retrieved one or more telemetry agents;

continuously monitoring, by the one or more hardware processors, a health status of the one or more software products and the one or more software components, based on the connection, by triggering, via the central monitoring and alerting load balancer, the one or more telemetry agents to monitor the health status;

determining, by the one or more hardware processors, via the central monitoring and the alerting load balancer, the health status of the one or more software products and the one or more components of the one or more software products;

transmitting, by the one or more hardware processors, via the one or more telemetry agents, the determined health status, to the central monitoring and the alerting load balancer;

managing, by the one or more hardware processors, via at least one of a virtual private cloud (VPC) and a virtual network (VNet) associated with the external hosting environment, one or more software products associated with the external hosting environment, based on the connection; and managing, by the one or more hardware processors, one or more operations of the one or more software products, based on the health status.

10. The method of claim 9, wherein the method further comprises:

managing, by the one or more hardware processors, via the one or more telemetry agents, a health of at least one of the VPC and the VNet associated with the external hosting environment, based on the one or more telemetry signals from the one or more telemetry agents.

11. The method of claim 9, wherein the method further comprises:

enforcing, by the one or more hardware processors, one or more access control policies on the retrieved one or more telemetry agents.

12. The method of claim 9, wherein the method further comprises:

deploying, by the one or more hardware processors, one or more software products to be deployed on clusters of container orchestration platforms associated with the one or more sources, based on one or more deployment configurations stored in a repository associated with the external hosting environment.

13. The method of claim 9, wherein the method further comprises:

transmitting, by the one or more hardware processors, via the one or more telemetry agents, the monitored health status of the one or more software products and the one or more components of the one or more software products, to the central monitoring and the alerting load balancer.

14. The method of claim 9, wherein the one or more sources comprises at least one of clusters of container orchestration platforms, external virtual machines, and bare metal servers on one or more ports.

15. The method of claim 9, wherein the health status comprises logs and metrics corresponding to the health status of the one or more software products and the one or more components of the one or more software products.

16. The method of claim 9, wherein the one or more operations comprises at least one of upgrading, updating, fixing an issue, fixing error, and fixing bug, of the one or more software products.

17. A non-transitory computer-readable storage medium having instructions stored therein that, when executed by one or more hardware processors, cause the one or more hardware processors to:
retrieve one or more telemetry agents from one or more sources associated with an external hosting environment, wherein the one or more telemetry agents generate one or more telemetry signals, wherein the external hosting environment comprises one or more software products and one or more software components of one or more software products;
connect a central monitoring and alerting load balancer associated with the external hosting environment, to the retrieved one or more telemetry agents;
continuously monitor a health status of the one or more software products and the one or more software components, based on the connection, by triggering, via the central monitoring and alerting load balancer, the one or more telemetry agents to monitor the health status;
determine, via the central monitoring and the alerting load balancer, the health status of the one or more software products and the one or more components of the one or more software products;
transmit, via the one or more telemetry agents, the determined health status, to the central monitoring and the alerting load balancer;
manage, via at least one of a virtual private cloud (VPC) and a virtual network (VNet) associated with the external hosting environment, one or more software products associated with the external hosting environment, based on the connection; and
manage one or more operations of the one or more software products, based on the health status.

18. The non-transitory computer-readable storage medium of claim 17, wherein the one or more hardware processors is further configured to:
manage, via the one or more telemetry agents, a health of at least one of the VPC and the VNet associated with the external hosting environment, based on the one or more telemetry signals from the one or more telemetry agents.

19. The non-transitory computer-readable storage medium of claim 17, wherein the one or more hardware processors is further configured to:
enforce one or more access control policies on the retrieved one or more telemetry agents.

20. The non-transitory computer-readable storage medium of claim 17, wherein the one or more hardware processors is further configured to:
deploy one or more software products to be deployed on clusters of container orchestration platforms associated with the one or more sources, based on one or more deployment configurations stored in a repository associated with the external hosting environment.

* * * * *